June 18, 1935.  F. E. E. BOOSS  2,005,671
SPECIFIC GRAVITY INDICATOR
Filed June 11, 1931

Inventor,
Frederick E. E. Booss.
By Ernest F. Mechlin
Attorney

Patented June 18, 1935

2,005,671

UNITED STATES PATENT OFFICE 2,005,671

SPECIFIC GRAVITY INDICATOR

Frederick E. E. Booss, Lancaster, N. Y., assignor to Gould Storage Battery Corporation, Depew, N. Y., a corporation of Delaware Application June 11, 1931, Serial No. 543,723

3 Claims. (Cl. 265—45)

The invention relates to certain improvements in gravity indicators for storage batteries and has for its object to provide a relatively simple form of indicator adapted to be held between the plate assembly and the wall of the cell, the indicators could be duplicated in each cell and disposed on opposite sides of the plate assembly, so that the indicators will be visible through the transparent walls of the jar and may be viewed from either side of the latter.

The invention is illustrated in the accompanying drawing, in which:—

Figure 1:
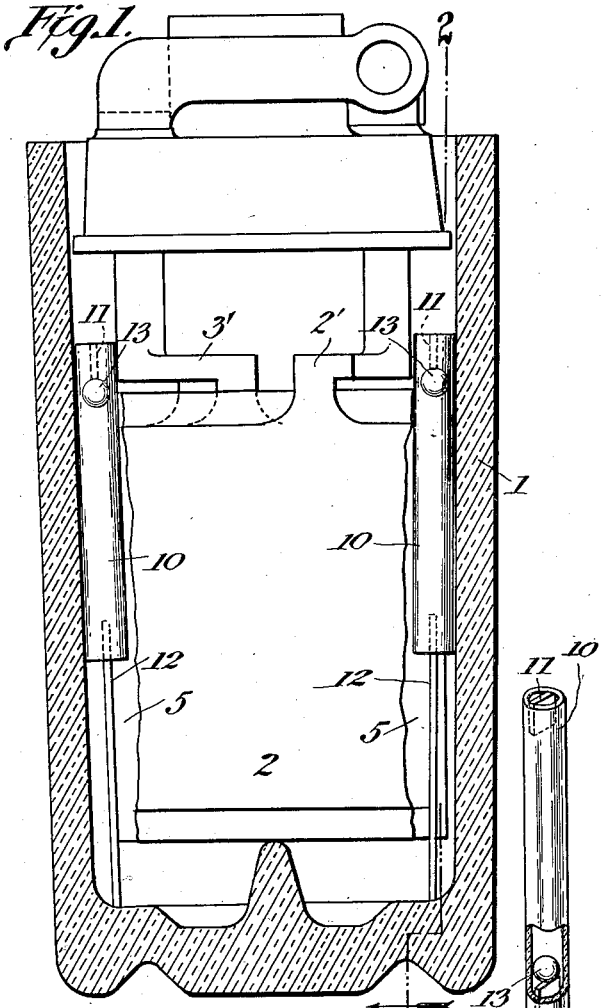
Fig. 1 is a vertical sectional elevation through a storage battery cell having two of the indicators applied thereto.

Referring to the drawing, 1 indicates a jar or container of a storage battery, made of glass or other transparent acid-proof material, in order that the interior thereof may be clearly visible through the transparent wall. Mounted in the jar of the container 1 is the usual assembly of positive and negative plates 2 and 3, the plates of the respective sets being connected by cross bars 2' and 3' carrying the terminals for connection to an external circuit. As shown, the battery includes five plates, three of which are negative and two of which are positive, the plates of the respective sets being alternated and spaced by any suitable form of separating means (not shown). It will be understood that the particular type and form of battery is merely exemplary and that the invention is applicable to batteries of other forms involving different numbers of positive and negative plates.

Figures 3, 4:
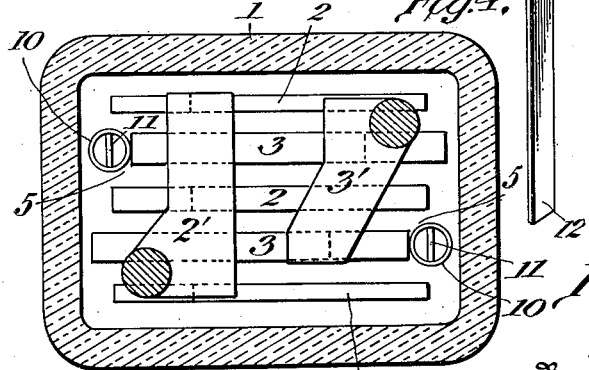
Fig. 3 is a sectional plan view.
Fig. 4 is a perspective view of the indicator, partly broken away and in section.

As indicated in Figs. 1 and 3, the positive plates 3 are staggered in opposite directions with respect to the negative plates, or offset lateraly in opposite directions, to provide vertical recesses 5, 5 on opposite sides of the plate assembly and facing opposite walls of the jar 1, which recesses are adapted to receive and retain the gravity indicators, so that each of the latter may be viewed through one side wall of the jar, thereby avoiding the necessity of turning the jar around, should conditions of use of the jar require the same to be disposed so that one of its faces is not visible. When the invention is applied to a battery involving a larger number of positive and negative plates than indicated in the drawing, it will be understood that two of the plates of like polarity will be laterally offset to form two recesses or pockets in the plate assembly to receive the indicators.

Figure 2:
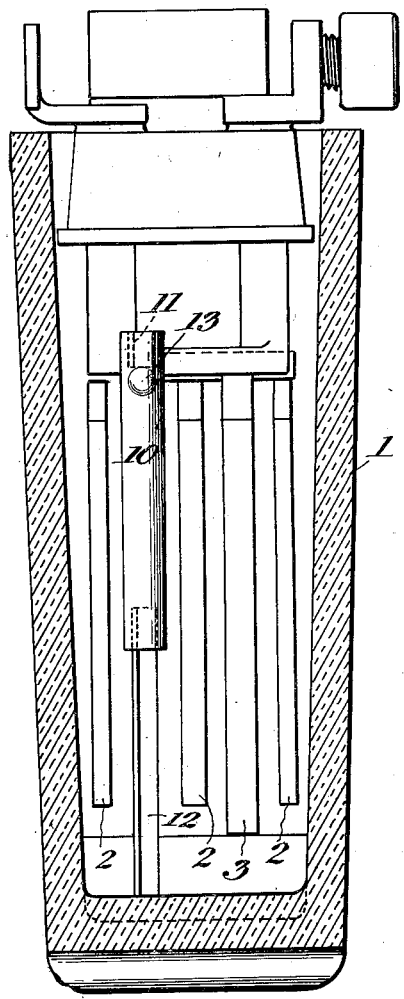
Fig. 2 is a section on line 2—2 of Fig. 1.

As shown, the indicator, involves a transparent tubular member provided with openings in its upper and lower portions to insure a circulation of the electrolyte when the indicator is immersed in the battery, the tube containing a ball or balls of predetermined density, or densities, such as has been employed in indicators of this character, which are freely movable in the tube, the tube being provided with abutments to define the upper and lower limits of movement of the ball and also being provided with means for supporting it from the bottom of the jar. In the form illustrated, the body of the indicator comprises a tubular section 10 of glass or other transparent acid-proof material, the open upper end of which is spanned by a cross bar 11. Fitted in the open bottom of the tube is a supporting leg or extension 12 in the form of a flat strip of glass, hard rubber, or any other suitable material, which strip serves as a support for the tubular body when the indicator is applied to the battery. The elements 11 and 12 constitute stops or abutments for limiting the movement of the ball 13, which constitutes the movable indicating element of the device. As shown in Figs. 1 and 2, one of these indicators is mounted in the respective pockets or recesses 5, 5, formed in the plate assembly, each being held in vertical position by the walls of the said recess and the adjacent walls of the jar, and each being supported by the extension or leg 12 from the bottom of the jar. This arrangement enables the indicator to be readily applied to or removed from the battery without disturbing the elements of the latter and, as an indicator is located adjacent two opposite transparent faces of the jar, the condition of the electrolyte, as shown by the indicators, may be readily observed from either side of the jar, thereby avoiding the necessity of turning the jar about, which was frequently necessary when a single indicator was employed and mounted adjacent a face of the jar, which was turned away from the observer.

What I claim is:

1. A specific gravity indicator for storage batteries, comprising a transparent tube adapted to be immersed in the battery electrolyte in permanent position and extending vertically between the plates and jar of the battery, said tube being open at its top and bottom for permitting circulation of the electrolyte, a cross bar spanning the open top of the tube, and an elongated strip extending into the lower end of the tube and designed to support the tube upon the bottom of the battery, and a ball of predetermined density freely movable within the tube and having its movement limited by said cross bar and strip.

2. A gravity indicator for storage batteries, comprising a transparent tube adapted to be immersed in the electrolyte of the battery in permanent vertical position between the battery plates and jar, a float of predetermined density freely movable within said tube, a transverse strip telescoped within the upper end of the tube and constituting a stop for limiting upward movement of said float, said strip being relatively thin compared with the diameter of the tube to define openings at the sides of the strip, and a strip telescoped within the lower end of the tube in spaced relation to the first named strip and constituting a stop for limiting downward movement of the float, said second named strip being likewise relatively thin compared with the diameter of the tube to provide openings at the sides of the strip, the openings thus defined at the upper and lower ends of the tubes enabling the electrolyte of the battery to circulate through the tube, said second named strip being prolonged downwardly beyond the lower end of the tube and adapted to engage the bottom of the battery for supporting the tube at the desired level.

3. A specific gravity indicator for storage batteries, comprising a transparent tube disposable in upright position within a battery so as to be immersed within the electrolyte thereof, a float of predetermined density freely movable longitudinally within the tube, the upper end of the tube having openings and being provided with a stop limiting upward movement of the float, and a strip telescoped within the lower end of the tube diametrically thereof and terminating in spaced relation to said stop and serving to limit downward movement of the float, said strip being relatively thin compared with the diameter of the tube to define openings between the strip and the inner wall of the tube, said strip being prolonged downwardly beyond the lower end of the tube and engageable with the bottom of the battery to serve as a support.

FRED'K E. E. BOOSS.